COUPLING SYSTEM FOR ELEMENTAL PANEL ARRAY

Filed March 23, 1967 2 Sheets-Sheet 1

INVENTOR
John E. Meyer, Jr.
BY W. H. Spoungle
ATTORNEY

June 30, 1970 J. E. MEYER, JR 3,518,627

COUPLING SYSTEM FOR ELEMENTAL PANEL ARRAY

Filed March 23, 1967 2 Sheets-Sheet 2

INVENTOR
John E. Meyer, Jr.
BY W. H. Spouagle
ATTORNEY

United States Patent Office 3,518,627
Patented June 30, 1970

3,518,627

COUPLING SYSTEM FOR ELEMENTAL PANEL ARRAY

John E. Meyer, Jr., Trenton, N.J., assignor to RCA Corporation, a corporation of Delaware Filed Mar. 23, 1967, Ser. No. 625,476
Int. Cl. H04q 3/02
U.S. Cl. 340—166 3 Claims

ABSTRACT OF THE DISCLOSURE

First a left-hand and then a right-hand group of half of the discrete elements in a row of the array are concurrently coupled for one half of a predetermined time period respectively to individual storage means associated with the respective columns of the array elements and all of the individual storage means are sequentially coupled to external apparatus once during said predetermined time period.

In panel-type arrays of a plurality of discrete elements, comprising either image pickup or display apparatus, it is necessary to couple signal information either out of or into the array elements by coupling to external apparatus. When the array elements are addressed individually for relatively short periods of time, it is possible to exchange only a small amount of signal energy between the external apparatus and the elements of the array.

An object of this invention is to provide a coupling system between the elements of a panel-type array and external apparatus which enables the exchange of a materially larger amount of signal energy than heretofore possible.

In accordance with an image sensor or pickup embodiment of the invention, the panel elements are photosensitive and are arranged in rows and colums, all of the elements in each row being connected together and to a vertical scanning system, and all of the elements in each column being connectable to respective signal storage means. The elements in each row are divided substantially equally into left-side and right-side groups. First the left-hand and then the right-hand group of the elements in a row is coupled concurrently and continuously to their respective column-associated storage means for substantially one half of a predetermined period of time. During the succeeding predetermined period of time the individual column-associated storage means are sequentially coppled to external apparatus, thereby producing video signals representative of the image-derived light at the different photosensitive panel elements. By such use of the storage means, higher level video signals are produced than are possible by direct addressing of the individual panel elements.

In an image display embodiment of the invention in which the panel elements are light emissive or light reflective, for example, the elemental video signals are sequentially coupled to respective column-associated storage means which are subsequently continuously connected, concurrently, to left-hand and right-hand groups of the elements in each row of the panel. Thus, the light output from the panel elements is increased by the resulting longer excitation thereof.

Figure 1:
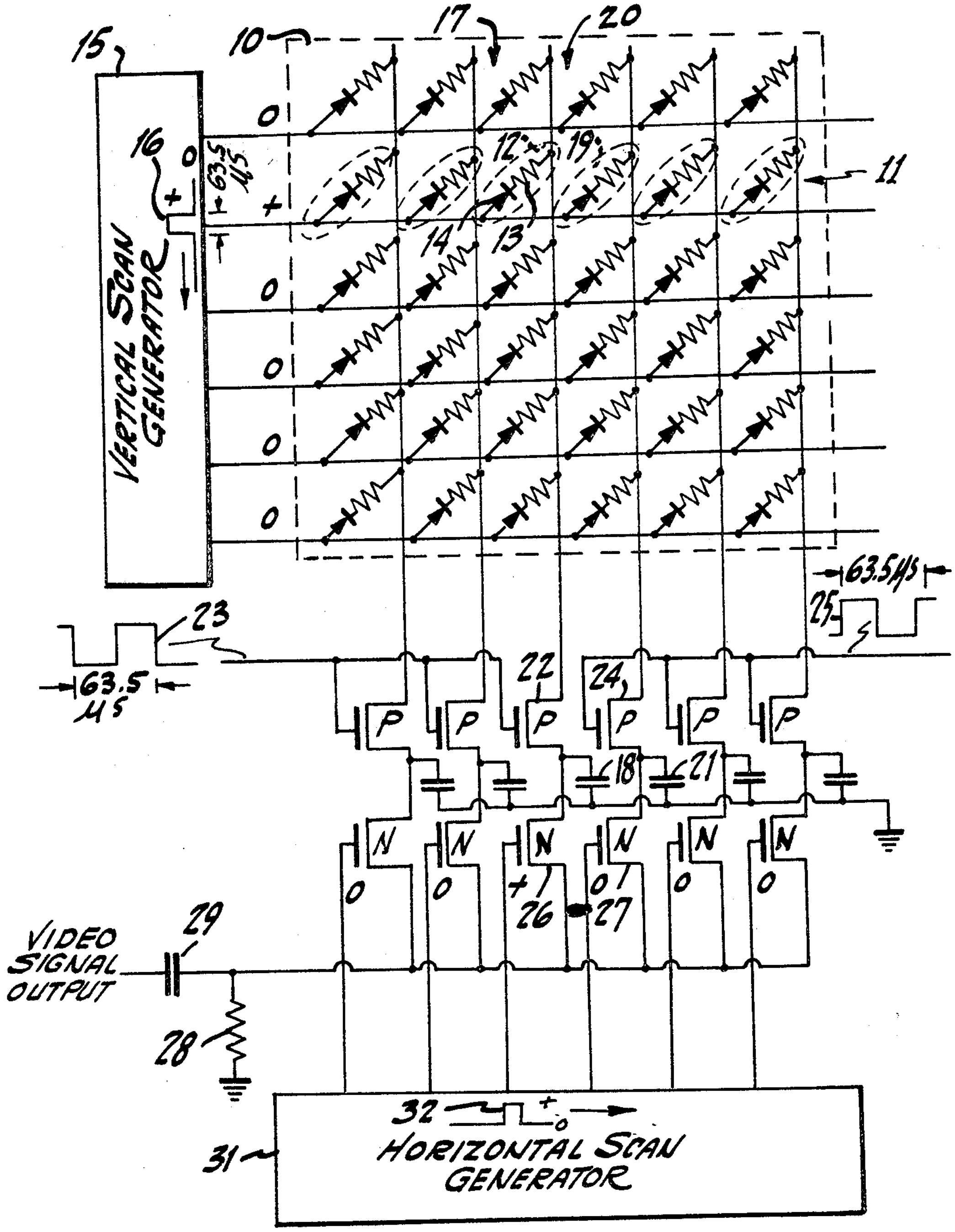
Figure 2:
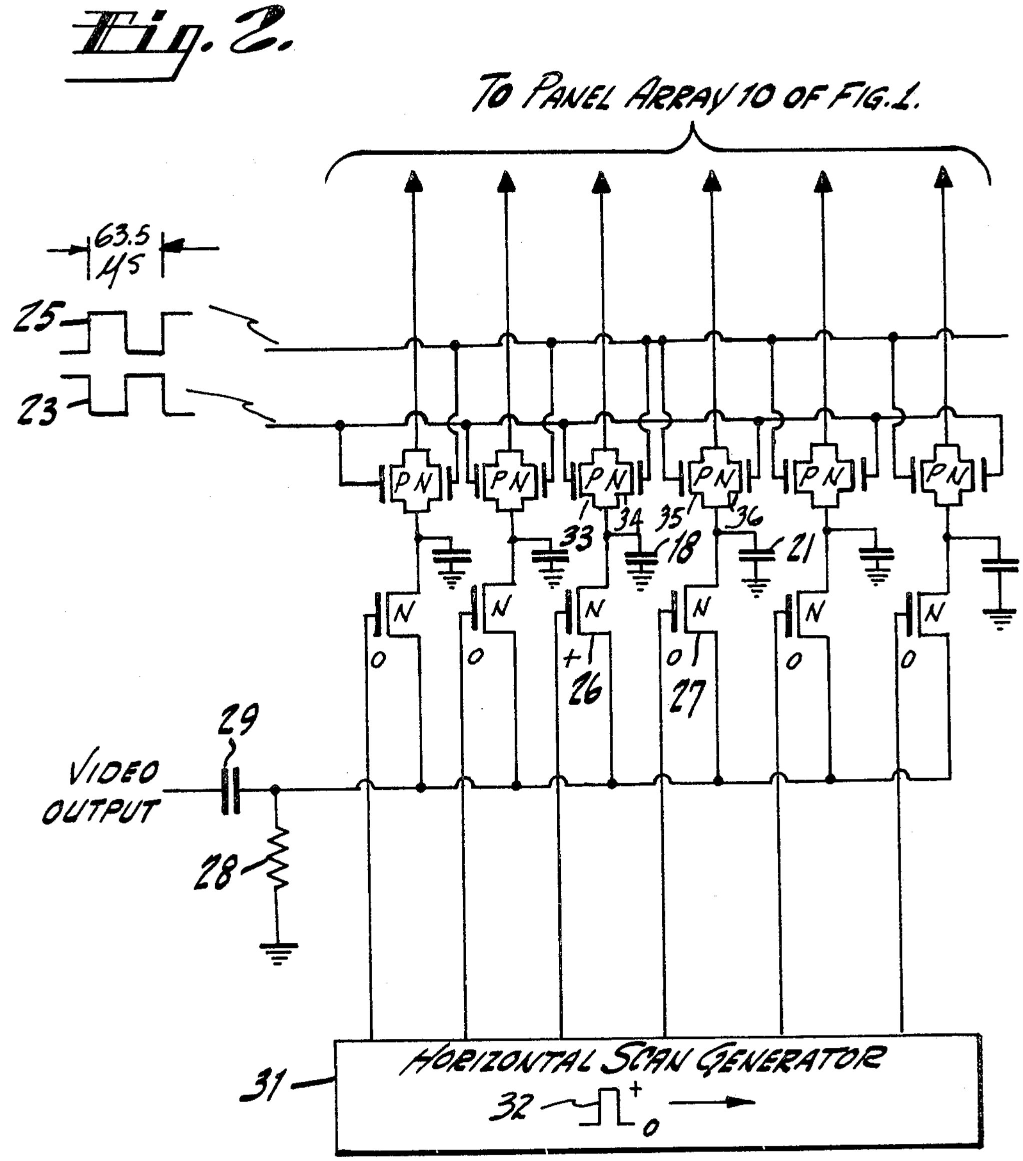

For a more detailed disclosure of the invention, reference may be had to the following detailed description of the coupling system shown in the accompanying drawings of which:

FIG. 1 is a schematic diagram of a portion of an image sensor and one form of a coupling system embodying the invention; and FIG. 2 is a schematic diagram of another form of a coupling system embodying the invention.

In the image sensor array 10 of FIG. 1, the panel elements are photosensitive and are arranged in rows and columns. In row 11, for example, each of the elements such as element 12 comprises a photoconductor, represented by a resistor 13, connected in series with a diode 14. When suitable connections are made to the panel elements, such as the element 12, current will flow through the photoconductor 13 and the diode 14 in an amplitude determined by the amount of light striking this element of the panel. Each horizontal row of the sensor panel 10, such as the row 11, is connected to a vertical scan generator 15 which may be in the form of a clock-controlled shift register which sequentially applies a positive-going pulse 16 to the respective row conductors of the panel array. The scan generator 15 may be of the type shown in Pat. 3,252,009 granted May 17, 1966 to P. K. Weimer.

Each column of the array 10 is associated with individual storage means which for column 17, as an example, comprises a capacitor 18. Signal transfer means are operative to couple substantially one-half of the elements of any one row concurrently to respective column-associated storage capacitors. In row 11, for example, the left-hand group of elements including the element 12 are associated respectively with a left-hand group of storage capacitors including the capacitor 18 and the right-hand group of elements including the element 19 of column 20 are associated respectively with a right-hand group of storage capacitors including the capacitor 21.

The signal transfer means for the vertical column 17 of array elements comprises a transistor 22, which may be a P-type insulated-gate field-effect device having its input and output (viz, source and drain) electrodes connected in series between the panel elements, such as element 12 of column 17, and its associated storage capacitor 18. Similar transistors are connected between the others of the left-hand group of panel columns and their associated storage capacitors. The control (viz, gate) electrodes of the left-hand group of transfer transistors, such as transistor 22, are connected together and to a source of a control pulse wave 23, each half-cycle of which has the repetition rate at which the horizontal lines or rows of the array 10 are scanned and a duration of one-half of a line period. Similarly, a signal transfer transistor, such as transistor 24, is connected between the associated elements, such as element 19, of the right-hand group of panel columns, including column 20, and the right-hand group of storage capacitors, including capacitor 21. The control electrodes of the right-hand group of signal transfer transistors are connected to a source of a control pulse wave 25. These pulses are similar to the pulses 23 except that they are oppositely phased.

Selector transistors, represented by transistors 26 associated with the left-hand group of panel elements and by transistor 27 associated with the right-hand group of panel elements are connected between the respective storage capacitors and external apparatus represented in this embodiment of the invention as an output load resistor 28 from which the signal is coupled by a capacitor 29 to suitable utilization apparatus. The selector transistors may be N-type insulated-gate field-effect devices, the control gates of which are connected to a horizontal scan generator 31. This generator also may be of the Weimer Pat. 3,252,009 type which applies a positive-going pulse 32 sequentially to the control gates of the selector transistors, such as the transistors 26 and 27, at the elemental scanning rate.

In considering the operation of the coupling system of FIG. 1, it should be noted that the vertical scan generator 15 normally connects the elements of the sensor panel 10 to ground or zero potential, thereby effectively preventing current flow through the panel elements. When it is desired to activate the elements of row 11, for example, the positive-going pulse 16 is impressed upon the row conductor. Also, for one-half of a line scanning period, a negative-going half cycle of the pulse wave 23 is applied to the control gates of the left-hand group of signal transfer transistors including the transistor 22, thereby rendering these transistors conducting. At the same time a positive-going half cycle of the pulse wave 25 is applied to the right-hand group of signal transfer transistors including the transistor 24, thereby rendering such transistors non-conducting. Thus, during this one half of a line scanning period, photocurrent flows through diode 14 and photoconductor resistor 13 of element 12, and through the signal transfer transistor 22 to the grounded storage capacitor 18, thereby charging this capacitor during one-half of a line scanning period. All other storage capacitors of the left-hand group of storage capacitors are similarly charged.

During the other half of a line scanning period the right-hand group of signal transfer transistors, including transistor 24, are rendered conducting by a negative-going half cycle of the pulse wave 25 and the left-hand group of signal transfer transistors are rendered nonconducting by a positive-going half cycle of the pulse wave 23. Charging of the left-hand group of storage capacitors including capacitor 18 is thus terminated and charging of the right-hand group of storage capacitors including capacitor 21 is initiated and continued through this other half of a line scanning period.

While capacitor 21 and the rest of the right-hand group of storage capacitors are being charged concurrently, capacitor 18 and the rest of the left-hand group of storage capacitors are being discharge sequentially through the load resistor 28 by the successive impressions of the positive-going pulse 32 from the horizontal scan generator 31 upon the transistors 26 and others of the left-hand group of selector transistors. When charging of the capacitor 21 and other of the right-hand group of storage capacitors has stopped and while the capacitor 18 and others of the left-hand group of storage capacitors are being recharged from the left-hand group of elements of another row of panel elements, selector transistor 27 and the rest of the right-hand group of selector transistors are sequentially rendered conducting by the pulse 32 from the horizontal scan generator 31, thereby individually discharging the right-hand group of storage capacitors through the load resistor 28.

All of the components and interconnections therebetween of the apparatus of FIG. 1 may be integrated to produce a completely solid state image sensor of such small size as to be easily susceptible of hand-held operation. Such a necessarily large scale integration of the great multiplicity of components required is readily accomplished by using known silicon technology or by evaporated thin-film techniques.

From the foregoing description, it is seen that the two groups of storage capacitors are alternately charged and discharged once during every horizontal line scanning period, the charging being for substantially one-half of a line period and the discharging being for an elemental period. In this way, video signals are developed which are materially increased in magnitude and, therefore, are relatively free of distortions produced by noise and the like. It is possible, however, when the left-hand and right-hand groups of transfer transistors, including transistors 22 and 24, are switched in the middle of a sequence of operation of the selector transistors such as transistors 26 and 27, that a transient may be transferred through the gate capacitance of the signal transfer transistors to the output circuit. Such a transient might be large enough to cause the production of a bright vertical line at the center of any display made from the video signals produced from apparatus such as that shown in FIG. 1.

Any such undesired transient effect may be overcome by the use of a signal transfer apparatus as shown in FIG. 2. Each of the charging circuits of the storage capacitors includes a parallel arrangement of P-type and N-type transistors. For example, P-type transistor 33 and N-type transistor 34 are associated with the storage capacitor 18 of the left-hand group, while P-type transistor 35 and N-type transistor 36 are associated with the storage capacitor 21 of the right-hand group. By connecting the control gates of the transistors such as 33, 34, 35 and 36 to the respective sources of the pulse waves 23 and 25 in the manner shown, during any negative half cycle of wave 23 and the concurrent positive half cycle of wave 25, all transistors such as transistors 33 and 34 of the left-hand group are conducting and all transistors such as transistors 35 and 36 of the right-hand group are nonconducting. During positive half cycles of the wave 23 and concurrent negative half cycles of the wave 25 all of the left-hand group of transistors are nonconducting and all of the right-hand group of transistors are conducting. Because the capacitances of the control gates of each pair of transistors are substantially equal, any switching transients are effectively cancelled because the two capacitances receive substantially equal and opposite charges from the oppositely phased control pulse waves 23 and 25.

The foregoing disclosure of image sensor embodiments of the invention illustrates the manner in which elemental image information is concurrently derived continuously for longer than an elemental period from substantially half of the elements of a row and stored for subsequent selection in an elemental sequential manner. In view of such disclosure it will be apparent that the invention also is applicable to image display systems. In a display system the elemental video signals are stored sequentially in the respective column-associated storage means which subsequently are discharged to concurrently and continuously energize for longer than an elemental period a plurality of the light producing elements of a row, thereby increasing the light output over that obtainable by sequential energization.

What is claimed is:

1. In a panel type array of a municipality of discrete elements arranged in rows and columns, the elements in each row being divided substantially equally into left-side and right-side groups, a coupling system for conveying signal information between said elements and external apparatus comprising:

signal storage means including a capacitor associated with each of said column of elements;

signal transfer means for concurrently and continuously coupling to said respective column-associated storage capacitors first all of said left-side and then all of said right-side groups of elements in a row, each group for one-half of a predetermined time period; and selector means for coupling said external apparatus sequentially to all of said individual column-associated storage capacitors during a next succeeding time period equal to said predetermined time period.

2. A coupling system as defined in claim 1 wherein:

said signal transfer means includes a transistor for each storage capacitor, said transistors being divided into left-side and right-side groups associated respectively with said left-side and right-side groups of panel elements, and each transfer transistor having input, output and control electrodes;

means connecting the respective input and output electrodes of said transistors in circuit between the respective storage capacitors and said respective columns of panel elements; and means for simultaneously operatively energizing continuously during respective halves of said predetermined time periods the control electrodes of first all of said left-side and then all of said right-side groups of transistors.

3. A coupling system as defined in claim 2 wherein:

said selector means includes a transistor for each storage capacitor, and each selector transistor having input, output and control electrodes;

means for operatively energizing the control electrodes of said selector transistors in series between said external apparatus and said storage capacitors; and means for operatively energizing the control electrodes of all of said selector transistors sequentially once during said predetermined time period.

References Cited

UNITED STATES PATENTS

| | | | |
|---|---|---|---|
| 2,967,265 | 1/1961 | Diemer et al. | |
| 3,054,988 | 9/1962 | Edwards et al. | 340—166 |
| 3,416,143 | 12/1968 | Van Goethem et al. | 340—166 |
| 3,435,138 | 3/1969 | Borkan | 340—166 |

THOMAS A. ROBINSON, Primary Examiner

U.S. Cl. X.R.

340—173

UNITED STATES PATENT OFFICE

CERTIFICATE OF CORRECTION

Patent No. 3,518,627 Dated June 30, 1970

Inventor(s) John E. Meyer, Jr.

It is certified that error appears in the above-identified patent and that said Letters Patent are hereby corrected as shown below:

Column 3, line 38, that portion reading "discharge" should read -- discharged -- .
Column 4, line 46, that portion reading "municipality" should read -- multiplicity -- .
Column 5, line 9, that portion reading "means for operatively energizing the control" should read -- means connecting the respective input and output -- .

SIGNED AND SEALED NOV 10 1970

(SEAL)
Attest:

Edward M. Fletcher, Jr.
Attesting Officer

WILLIAM E. SCHUYLER, JR.
Commissioner of Patents